United States Patent [19]

Jacobson

[11] Patent Number: 4,820,000
[45] Date of Patent: Apr. 11, 1989

[54] GLOVE BAG WASTE REMOVAL SYSTEM FOR ASBESTOS IMPREGNATED BRAKES

[76] Inventor: Earl B. Jacobson, 510 S. Shore Dr., Crystal Lake, Ill. 60014

[21] Appl. No.: 1,075

[22] Filed: Jan. 7, 1987

[51] Int. Cl.$^4$ .............................................. A61G 11/00
[52] U.S. Cl. .................................... 312/1; 15/345; 134/6; 134/42; 312/3
[58] Field of Search ............... 312/1, 3, 5, 6, 283; 128/1 B, 1 R; 280/770; 224/42.42, 42.45 R, 42.46 R; 15/227, 345; 134/6, 10, 21, 42; 138/97

[56] References Cited

U.S. PATENT DOCUMENTS

| 2,786,740 | 3/1957 | Taylor et al. ................ 312/1 |
| 3,051,163 | 8/1962 | Trexler ..................... 128/30 X |
| 3,051,164 | 8/1962 | Trexler ..................... 128/1 B X |
| 3,086,674 | 4/1963 | Scheuerman ................. 312/1 X |
| 3,222,707 | 12/1965 | Allenbaugh . |
| 3,510,905 | 5/1970 | Bannert ....................... 15/345 |
| 4,141,609 | 2/1979 | Eisert ........................ 312/1 |
| 4,205,412 | 6/1980 | Weber . |
| 4,327,760 | 5/1982 | Lancaster ................... 312/1 X |
| 4,373,547 | 2/1983 | Geis et al. ................... 312/1 X |
| 4,485,490 | 12/1984 | Akers et al. ................. 312/1 X |
| 4,505,190 | 3/1985 | Fink et al. .................. 138/97 X |
| 4,626,291 | 12/1986 | Natale ........................ 312/3 X |
| 4,643,471 | 2/1987 | Fishback .................... 280/770 X |
| 4,712,270 | 12/1987 | Palmer . |

FOREIGN PATENT DOCUMENTS

| 2643067 | 3/1978 | Fed. Rep. of Germany ........ 15/345 |
| 2936779 | 4/1981 | Fed. Rep. of Germany ........ 15/345 |
| 3004066 | 8/1981 | Fed. Rep. of Germany ......... 312/1 |
| 765635 | 6/1934 | France ........................ 312/1 |
| 2346061 | 10/1977 | France ....................... 15/345 |
| WO8605431 | 9/1986 | PCT Int'l Appl. ............. 312/1 |

OTHER PUBLICATIONS

Hako, Minuteman, Asbestos Brake Drum Vacuum System, pp. 1–4.
Nilfisk, Nilfisk Asbestos-Clene Systems, pp. 1–4.
Pro/Control Products, Encapsulator, 1987, pp. 1–4.

Primary Examiner—Peter A. Aschenbrenner
Assistant Examiner—Thomas A. Rendos
Attorney, Agent, or Firm—Silverman, Cass, Singer & Winburn, Ltd.

[57] ABSTRACT

A lightweight, collapsible preferably PVC formed glove bag asbestos brake removal/confinement system. The bag includes removable stiffening ribs and a flexible membrane or bunge controlled opening in one end to mount the bag over the brake assembly. The bag can be suspended from the automobile itself, such as by a mechanical clamp or magnetic plate assembly, or from any convenient location. The bottom of the bag includes an access zipper for removing or placing tools or the brakes in the bag. The bag optionally includes a removable bottom protective panel to prevent penetration of the bag by tools or brakes dropped thereon.

14 Claims, 1 Drawing Sheet

GLOVE BAG WASTE REMOVAL SYSTEM FOR ASBESTOS IMPREGNATED BRAKES

BACKGROUND OF THE INVENTION

The invention relates generally to hazardous waste removal systems and more particularly to an improved glove bag removal system for removing asbestos impregnated brakes in a defined area.

Numerous prior art glove bag waste removal systems have been utilized for a considerable period of time for removing waste from a closely defined work area in which the contaminated or hazardous wastes are confined. The worker is protected from the wastes since the wastes are confined inside of the system and the worker works in the system but avoids direct contact with the wastes by utilizing the well known glove bag concept.

One particular application for glove bag waste removal is in removing or repairing asbestos impregnated brake drum assemblies. Asbestos fibers or particles are a proven hazardous waste and the free releasing of the fibers/particles into the air is a serious health hazard to workers and anyone else in the work area. OSHA & NIOSH therefor have issued strict standards for limiting the release of the fibers/particles to prevent exposing people to these hazardous wastes.

Several prior art waste removal protection systems have been proposed for cleaning, removing or working on asbestos impregnated brakes and other brake parts. One system utilizes a vinyl hood on a cylindrical metal wire cage suspended from a separate dolly stand. The hood is substantially clear for visibility of the worker and has a built-in air nozzle for dislodging the asbestos waste. A second type of system utilizes a rigid cylinder with one or more viewing windows which can be mounted on a low type jack or a hydraulic lift. The cylinder also has built-in compressed air guns with quick connect couplings and one to three cotton sleeves for access to the inside of the cylinder. Both systems are adapted to be connected to a negative pressure or vacuum filter system which maintains the system in a negative pressure to sweep out any dislodged asbestos waste.

Such systems although viable, present a number of disadvantages for the user, especially users with a number of brake removal stations. The systems and their attendant stands are expensive and very cumbersome to move around and/or to share between workers.

Another somewhat related glove bag waste removal system and application is disclosed in application Ser. No. 001,074, entitled "Hazardous Waste Glove Bag Removal System", filed concurrently herewith, the disclosure of which is incorporated herein by reference.

SUMMARY OF THE INVENTION

The above and other disadvantages of prior art asbestos brake removal/confinement systems and techniques are overcome in accordance with the present invention by providing a lightweight, collapsible glove bag waste removal system which easily is mounted onto and removed from brake assemblies while protecting the worker from release of the hazardous asbestos waste fibers/particles.

The glove bag preferably is formed from optically clear, flexible PVC material with removable stiffening ribs. The bag can be suspended from the automobile itself, such as by mechanical clamps or a magnetic hook assembly, or from any other convenient location such as a crane hook or a jack, if desired.

The bag includes one or more glove sleeves and access for one or more compressed air hoses and/or tools. The bottom of the bag includes an access zipper for removing or placing the brakes or tools in the bag and optionally includes a removable bottom protective PVC or plastic panel to prevent penetration of the bag by tools or brakes dropped by the worker thereon. The bag includes a flexible membrane or bunge controlled opening in one end to mount the bag over the brake assembly.

DESCRIPTION OF THE PREFERRED EMBODIMENTS

Figure 1:
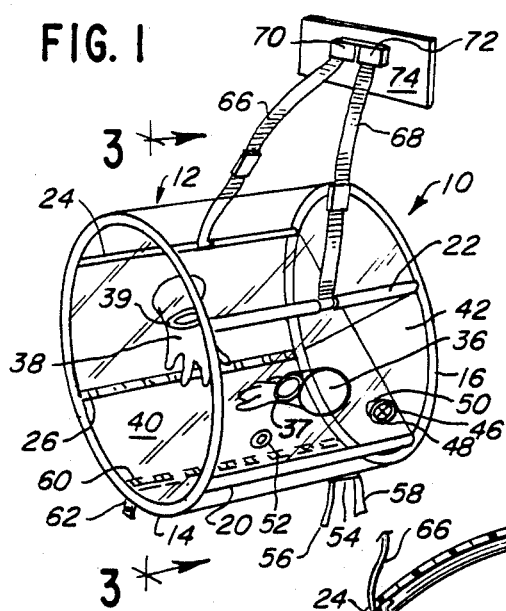
FIG. 1 is a perspective view of the one embodiment of the asbestos brake removal/confinement system of the invention.
Figure 3:
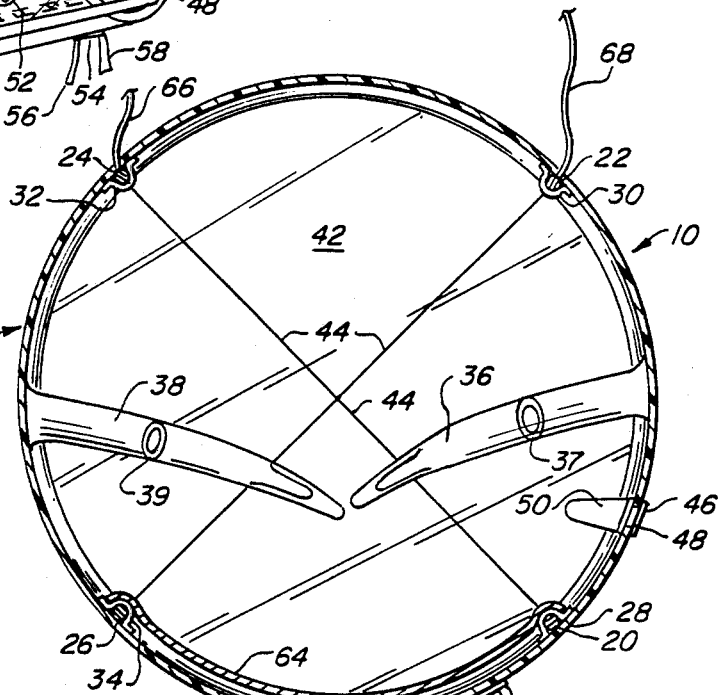
FIG. 3 is an end sectional view of the system of FIG. 1 taken along the line 3—3 therein.

Referring to FIGS. 1 and 3, a first embodiment of the asbestos glove bag brake removal/confinement system of the invention is designed generally by the reference character 10. The system 10 includes a confinement housing or bag 12, which preferably is formed from an optically clear flexible PVC material, to provide strength while allowing the worker good vision into the bag. The bag 12 has a pair of semirigid rings 14 and 16 sealed to or within the ends of the bag 12. The bag 12 can be formed from several pieces of PVC material and then electronically welded or heat sealed to form an integral non-leaking bag. The rings 14 and 16 preferably are tubes formed from semirigid PVC material and then are encased within the bag PVC material before sealing therein.

Figure 2:
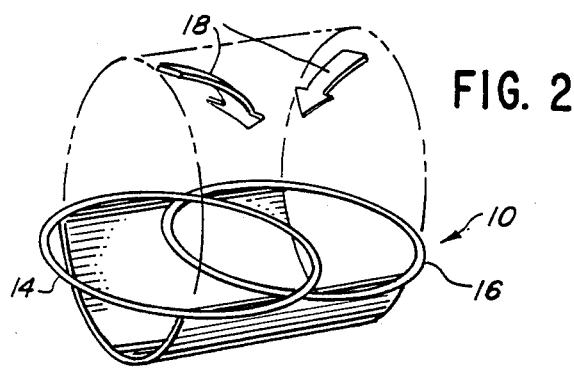
FIG. 2 is a perspective functional diagram of the collapsibility of the system of FIG. 1.

The bag 12 is generally collapsible as illustrated by arrows 18 in FIG. 2, for storage or shipping. However, the bag 12 is assembled by inserting a plurality of removable stiffening tubes or rods 20, 22, 24, and 26, which are inserted into respective sleeves 28, 30, 32, and 34 bonded to the bag 12.

The bag 12 includes at least one glove sleeve 36 in one side thereof for use by the worker to avoid contact with the asbestos waste. Preferably the bag 12 includes a second glove sleeve 38 in the opposite side thereof to allow the worker easily to manipulate the tools or brake assembly inside the bag 12. The glove sleeves 36 and 38 can include respective rigid cuffs 37 and 39, preferably made from plastic, PVC or metal materials. The cuffs 37 and 39 can be secured, welded or otherwise sealingly attached to the sleeves 36 and 38. This keeps the glove portions open for easy access and allows the glove portions to be separate replaceable parts. Also, the bag 12 could include a third glove sleeve (not illustrated) in one end 40 of the bag 12, which would reach the length of the bag 12.

The opposite end of the bag 12 includes a flexible sealing membrane 42, which is inserted over the brake assembly when the bag 12 is mounted for use by the worker. The membrane 42 can have a plurality of cross slits 44 which allow the membrane 42 to be fitted over the brake assembly, much like a button/button hole assembly. The membrane 42 also can be replaced by other types of sealing means such as a bunge controlled opening, which opening also could be utilized in addition to the membrane 42.

The bag 12 further includes a plurality of access openings to provide various functions for the worker without allowing the waste to escape. A self-sealing penetration sleeve 46 is provided on one side of the bag 12, to provide access for a probe, such as an additional vacuum or compressed air probe. The sleeve 46 includes a self-sealing cross slit membrane 48, which along with an inner tube 50 ensures that the penetration of the sleeve 46 by a probe does not release waste. The details of the sleeve 46 are disclosed in co-pending application Ser. No. 001,074.

The bag 12 also includes at least one grommet 52, which provides a conventional quick disconnect compressed air hose fitting. Additionally, the bag 12 includes a second self-sealing penetration sleeve 54, which further includes a pair of ties or tabs 56 and 58 for attachment to and securing of a vacuum probe (not illustrated) for removal of the loose waste to the conventional filter system (also not illustrated).

The bottom of the bag 12 includes an access zipper 60 along the length thereof, which can be opened as desired by manipulating a zipper pull 62. Additionally, if desired, the bag 12 can include a removable bottom protective panel 64, which can be placed in the bottom of the bag to prevent penetration of the bag 12 when a tool or brake is dropped thereon. The panel 64 also can be formed from a substantially rigid PVC material.

The system 10 can be suspended for work on a brake assembly by a pair of adjustable straps 66 and 68. The straps 66 and 68 can include various fastening means 70 and 72 on the ends thereof such as hooks, synthetic materials which adhere when pressed together such as VELCRO ® loops and hooks or snap connect assemblies in various configurations. The straps 66 and 68 can be utilized to support the system 10 from a variety of support structures, such as overhead cranes or hydaulic lifts.

Figure 4:
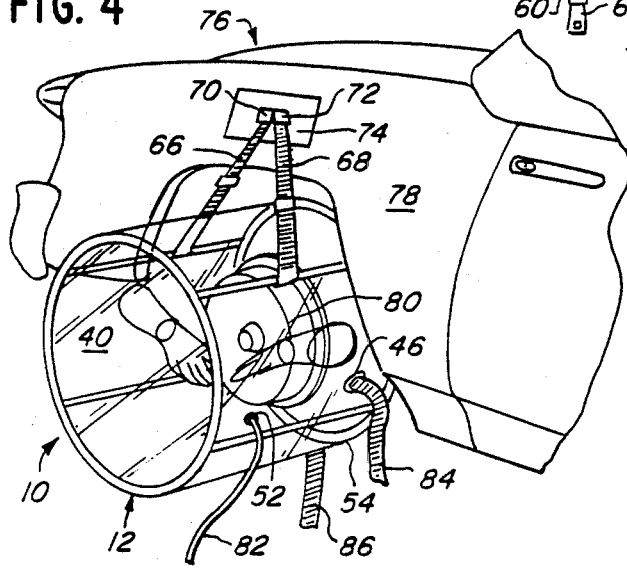
FIG. 4 is a perspective view of the system of FIG. 1 mounted on an automobile and the brake assembly thereof.
Figure 5:
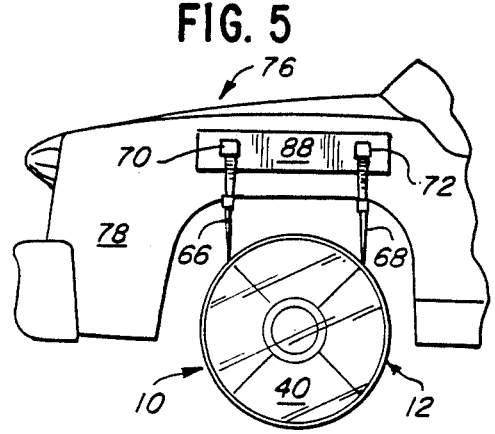
FIG. 5 is an end view of a second mounting embodiment of the invention mounted on the automobile and the brake assembly thereof.

Additionally, in one preferred embodiment, the system 10 can be suspended from a magnetic plate 74, which preferably is attached to an automobile 76 as illustrated in FIGS. 4 and 5. The plate 74, preferably is a flexible magnetic plate such as formed from magnetic impregnated polymer or PVC material. The plate 74 then is attached directly to a fender 78 of the automobile 76. The system 10, which only weighs about three to four pounds, is mounted over a brake assembly 80 of the automobile 76 and then hung by the straps 66 and 68 and hooks 70 and 72 from the plate 74. The various hoses or probes then can be inserted into the bag 12, such as a compressed air hose 82 in the grommet 52 and a vacuum line or second air hose probe 84 into the sleeve 46. A main vacuum line probe 86 would be inserted and secured into the sleeve 54.

If desired, or for utilization on automobiles with fiberglass fenders, the system 10 also can be suspended from other locations as described above. Also, low pressure mechanical clamping means (not illustrated) could be utilized on the edge of the wheel well of the fenders 78 to provide support for the system 10.

The system 10 also can be suspended from a second magnetic panel 88, as illustrated in FIG. 5. The panel 88 is of a sufficient length to suspend the system 10 with the straps 66 and 68 substantially vertical to provide additional stability to the system 10. The plate 74, the panel 88 and the clamps (not illustrated) also can be utilized in combination with a low tack/high tack gripping tape on the contact surface thereof to ensure that the plate 74, the panel 88 and the clamp will not slide or be otherwise dislodged until the worker has completed the job. Once the job is completed, the worker removes the system 10 for storage and reuse, or disposal if appropriate.

Many modifications and variations of the present invention are possible in light of the above teachings. Clearly the size, shape and spacing of the bag and openings therein can be varied depending upon the application. Also, although four stiffening rods or ribs are disclosed, more or less rods could be utilized. The sleeves 46 and 54 and the grommet 52 also can be utilized to place tools, such as a screw driver, into the bag 12. The removable and replaceable glove portions are important, since the system 10 generally is reusable. It is therefore, to be understood that within the scope of the appended claims, the invention may be practiced otherwise than as specifically described.

What is claimed and desired to be secured by Letters Patent of the United States is:

1. A glove bag waste removal system for asbestos impregnated brakes, comprising:
   a containment bag having at least one glove sleeve means therein and flexible opening means for mounting said bag over a brake assembly, said bag including a clear body formed in a substantially cylindrical shape, which includes a pair of substantially rigid end rings secured thereto at opposite ends thereof to form said body substantially into a cylindrical shape, said opening means formed in a first end thereof substantially in a plane formed by a first end ring, said opening means including flexible sealing membrane means having at least a pair of cross slits therein, said cross slits formed orthogonally to one another to form a button/buttonhole like assembly for inserting over the brake assembly and having a second end formed opposite said first end adjacent a second end ring, said second end sealed to said second end ring and a plurality of stiffening means inserted between said rings substantially parallel to one another in sleeves secured to said body to form said cylindrical shape; and
   means for supporting said bag adjacent the brake assembly.

2. The system as defined in claim 1 wherein said bag includes said glove sleeve means located in one side thereof.

3. The system as defined in claim 2 wherein said bag includes at least a second glove sleeve means therein.

4. The system as defined in claim 1 wherein said bag includes zipper means in the bottom thereof to allow access into said bag.

5. The system as defined in claim 1 wherein said bag includes removable bottom protective panel means to prevent inadvertent penetration of said bag.

6. The system as defined in claim 1 wherein said bag body is formed from clear lightweight PVC material, which body is collapsible for shipping and storage with said stiffening means being removable.

7. The system as defined in claim 1 wherein said supporting means include straps secured to said bag and magnetic plate means for securing said straps and said bag to a convenient surface, such as a car fender.

8. The system as defined in claim 7 wherein said magnetic plate means include a flexible plate member formed from magnetic impregnated polymer or PVC material.

9. The system as defined in claim 1 wherein said supporting means include means for suspending said bag from any convenient location.

10. A glove bag waste removal system for asbestos impregnated brakes, comprising:
a collapsible containment bag having at least one glove sleeve means therein and flexible opening means for mounting said bag over a break assembly;
means for supporting said bag adjacent the brake assembly;
a pair of substantially rigid end rings secured to said bag wherein when said bag is in the collapsed condition said rings lie in a horizontal plane and when said bag is in an open condition said rings lie in a vertical plane to form a system body having a substantially cylindrical shape, said opening means formed in a first end thereof substantially in a plane formed by a first end ring, said opening means including flexible sealing membrane means having at least a pair of cross slits therein, said cross slits formed orthogonally to one another to form a button/buttonhole like assembly for inserting over the brake assembly and having a second end formed opposite said first end adjacent a second end ring, said second end sealed to said second end ring; and
a plurality of removable stiffening means inserted between said rings when said bag is in the open condition, said stiffening means positioned substantially parallel to one another and secured to said body to form said cylindrical shape.

11. A glove bag waste removal system for asbestos impregnated brakes, comprising:
a containment bag having at least one glove sleeve means therein and flexible opening means for mounting said bag over a brake assembly, said bag including a clear body formed in a substantially cylindrical shape, which includes a pair of substantially rigid end rings secured thereto at opposite ends thereof to form said body substantially into a cylindrical shape, said opening means formed in a first end thereof and a second end sealed to a second end ring and a plurality of stiffening means inserted between said rings substantially parallel to one another in sleeves secured to said body to form said cylindrical shape;
means for supporting said bag adjacent the brake assembly; and
said supporting means include straps secured to said bag and magnetic plate means for securing said straps and said bag to a convenient surface, such as a car fender.

12. The system as defined in claim 11 wherein said magnetic plate means include a flexible plate member formed from magnetic impregnated polymer or PVC material.

13. A glove bag waste removal system for asbestos impregnated brakes, comprising:
a collapsible containment bag having at least one glove sleeve means therein and flexible opening means for mounting said bag over a break assembly;
means for supporting said bag adjacent the brake assembly;
a pair of substantially rigid end rings secured to said bag wherein when said bag is in the collapsed condition said rings lie in a horizontal plane and when said bag is in an open condition said rings lie in a vertical plane to form a system body having a substantially cylindrical shape;
a plurality of removable stiffening means inserted between said rings when said bag is in the open condition, said stiffening means positioned substantially parallel to one another and secured to said body to form said cylindrical shape; and
said supporting means include straps secured to said bag and magnetic plate means for securing said straps and said bag to a convenient surface, such as a car fender.

14. The system as defined in claim 13 wherein said magnetic plate means include a flexible plate member formed from magnetic impregnated polymer or PVC material.

* * * * *